United States Patent
Wang et al.

(10) Patent No.: US 11,937,289 B2
(45) Date of Patent: Mar. 19, 2024

(54) MECHANISMS FOR DYNAMIC I2V AND V2V RESOURCE SHARING USING A SHARED RESOURCE POOL

(71) Applicant: QUALCOMM Incorporated, San Diego, CA (US)

(72) Inventors: Xiao Feng Wang, San Diego, CA (US); Shuping Chen, Beijing (CN); Yan Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 17/429,314

(22) PCT Filed: Mar. 9, 2020

(86) PCT No.: PCT/CN2020/078355
§ 371 (c)(1),
(2) Date: Aug. 6, 2021

(87) PCT Pub. No.: WO2020/187071
PCT Pub. Date: Sep. 24, 2020

(65) Prior Publication Data
US 2022/0110134 A1    Apr. 7, 2022

(30) Foreign Application Priority Data
Mar. 15, 2019  (WO) ................ PCT/CN2019/078243

(51) Int. Cl.
*H04W 72/56* (2023.01)
*H04W 4/44* (2018.01)
(Continued)

(52) U.S. Cl.
CPC ............. *H04W 72/56* (2023.01); *H04W 4/44* (2018.02); *H04W 28/0289* (2013.01); *H04W 28/26* (2013.01)

(58) Field of Classification Search
CPC ................................................ H04W 4/30–48
See application file for complete search history.

(56) References Cited

U.S. PATENT DOCUMENTS

2016/0338078 A1* 11/2016 Wang .................. H04W 72/542
2018/0042023 A1*  2/2018 Sheng ..................... H04W 4/40
(Continued)

FOREIGN PATENT DOCUMENTS

CN    104796418 A    7/2015
CN    105430616 A    3/2016
(Continued)

OTHER PUBLICATIONS

Fujitsu: "Discussion on resource allocation for V2V based on LTE sidelink", 3GPP TSG RAN WG1 Meeting #85, R1-164322, May 27, 2016 (May 27, 2016), 3 Pages, Best Available Date: May 23-27, 2016.

(Continued)

*Primary Examiner* — San Htun
(74) *Attorney, Agent, or Firm* — Procopio, Cory, Hargreaves & Savitch LLP

(57) ABSTRACT

Aspects are provided for dynamic resource sharing between V2V and I2V communications. A wireless device selects resources from a shared resource pool in frequency and time. The shared resource pool is shared for I2V communication and communication over a PC5 interface originating from a User Equipment (UE). The wireless device identifies a first priority level for communication from a set of priority levels for I2V communication and UE originated communication. The set of priority levels may comprise at least one priority level unique to the I2V communication.

26 Claims, 11 Drawing Sheets

(51) Int. Cl.
*H04W 28/02* (2009.01)
*H04W 28/26* (2009.01)

(56) References Cited

U.S. PATENT DOCUMENTS

| | | | | |
|---|---|---|---|---|
| 2018/0242385 | A1* | 8/2018 | Chandramouli | H04W 4/44 |
| 2019/0104512 | A1* | 4/2019 | Vura | H04W 72/02 |
| 2020/0092907 | A1* | 3/2020 | Yi | H04W 72/0446 |
| 2020/0344643 | A1* | 10/2020 | Zhou | H04W 76/14 |

FOREIGN PATENT DOCUMENTS

| | | |
|---|---|---|
| EP | 3592025 A1 | 1/2020 |
| WO | 2018031519 A1 | 2/2018 |
| WO | 2018032001 A1 | 2/2018 |
| WO | 2018084520 A1 | 5/2018 |
| WO | 2018084599 A1 | 5/2018 |
| WO | 2018157611 A1 | 9/2018 |

OTHER PUBLICATIONS

International Search Report and Written Opinion—PCT/CN2019/078243—ISA/EPO—dated Jul. 5, 2019.
International Search Report and Written Opinion—PCT/CN2020/078355—ISA/EPO—dated May 25, 2020.
NTT DOCOMO: "Initial Evaluation for PC5 Based V2I/I2V and Uu Based I2V Communications," 3GPP TSG RAN WG1 Meeting #84, R1-161054, Feb. 15-19, 2016, Feb. 5, 2016 (Feb. 5, 2016), Section 1-3, 6 pages.
NTT DOCOMO: "Operational Aspects and Necessary Functionality for V2I and V2P", 3GPP TSG RAN WG1 Meeting #83, R1-157316, Nov. 22, 2015 (Nov. 22, 2015), 3 pages, Best Available Date: Nov. 15-22, 2015.
Samsung: "Discussion on PC5-based V2I and V2P", 3GPP TSG RAN WG1 #84, R1-160582, Feb. 19, 2016 (Feb. 19, 2016), 2 Pages, p. 1, section 2. Discussion on PC5-based V2I, Available Date: Feb. 15-19, 2016.
Interdigital Inc: "On Reporting of Sensing Results for Pool Sharing", 3GPP RAN WG2 Meeting #102, R2-1806829 (R15 LTE WI A91031 Reporting of Sensing Results), 3rd Generation Partnership Project, Mobile Competence Centre, 650, Route Des Lucioles, F-06921 Sophia-Antipolis Cedex, vol. RAN WG2, No. Busan, Korea, Apr. 16, 2018-Apr. 20, 2018 May 20, 2018, XP051443278, pp. 1-4, p. 3, Date: Apr. 16-20, 2018.
Supplementary European Search Report—EP20774698—Search Authority—Munich—dated Oct. 20, 2022.

* cited by examiner

US 11,937,289 B2

MECHANISMS FOR DYNAMIC I2V AND V2V RESOURCE SHARING USING A SHARED RESOURCE POOL

CROSS-REFERENCE TO RELATED APPLICATION(S)

This application is National Phase of International Patent Application Serial No. PCT/CN2020/078355, entitled "MECHANISMS FOR DYNAMIC I2V AND V2V RESOURCE SHARING USING A SHARED RESOURCE POOL" and filed on Mar. 9, 2020, which claims the benefit of International Application Serial No. PCT/CN2019/078243, entitled "MECHANISMS FOR DYNAMIC I2V AND V2V RESOURCE SHARING USING A SHARED RESOURCE POOL" and filed on Mar. 15, 2019, which is expressly incorporated by reference herein in its entirety.

BACKGROUND

Technical Field

The present disclosure relates generally to communication systems, and more particularly, to vehicle-to-vehicle (V2V), vehicle-to-everything (V2X), or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or other D2D communication. There exists a need for further improvements in V2X, V2V, and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus selects resources from a shared pool of resources in frequency and time. The shared pool of resources are shared for Infrastructure-to-Vehicle (I2V) communication and User Equipment (UE) originated communication over a PC5 interface. The apparatus identifies a priority level for communication from a set of priority levels for I2V communication and UE originated communication. At least one of the set of priority levels may be unique to the I2V communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
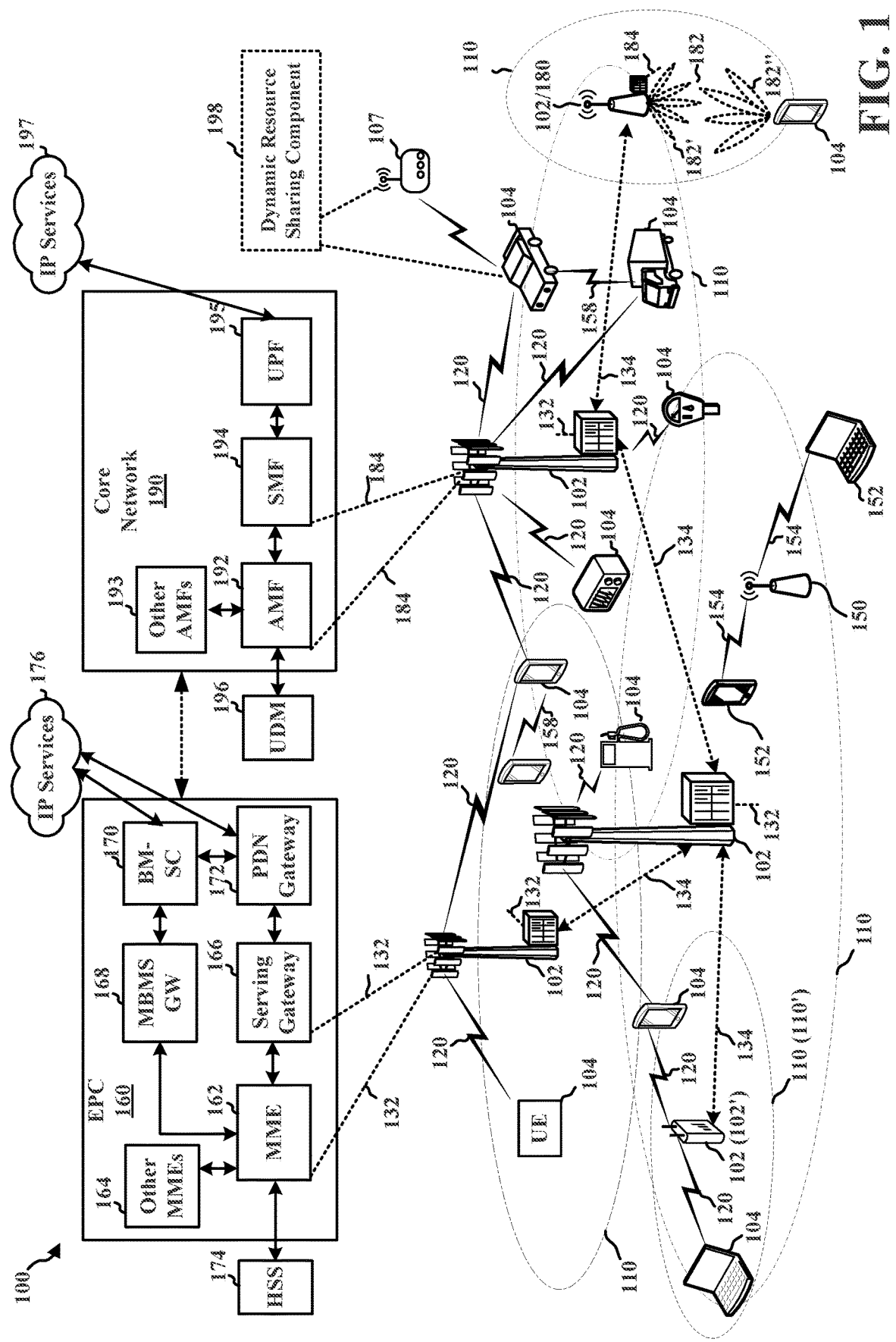
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In I2V communications, an infrastructure may manage different traffic needs depending on the services the infrastructure is configured to provide. For example, an RSU may be strategically located at an intersection to collect data from vehicles passing through the intersection and to sense environmental conditions using onboard sensors. Based on this data and sensors, the RSU may broadcast information (e.g. a nearby accident or a crossing pedestrian) over the PC5 interface to the vehicles driving towards the intersection, which in turn may communicate this information to other vehicles.

In order to maintain resources in time and frequency for I2V communication, the available resources may be separated into separate resource pools, with one resource pool reserved for I2V communication. However, I2V and V2V traffic may vary over time, location, and the type of services performed. Thus, while such a partition of resources may ensure that I2V communication has available resources, the partition may lead to wasted resources in areas without an RSU or during times when an RSU does not transmit many messages, for example. Accordingly, the present disclosure provides for dynamic resource sharing between V2V and I2V communications to enable more efficient use of resources than static resource partitioning and may account for variations in channel usage.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Such a communication system may also involve other communication, such as I2V communication. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or other D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, shared resources may be used for I2V communication and for vehicle originated communication (e.g., V2V, V2I, etc.). As described herein, a wireless device engaged in communication based on PC5 or sidelink communication (e.g., UE 104 and/or RSU 107) may comprise a dynamic resource sharing component 198 configured to select resources from a shared pool of resources in frequency and time for I2V communication and communication over a PC5 interface originating from a UE. The dynamic resource sharing component 198 may be configured to identify a priority level for communication from a set of priority levels for I2V communication and UE originated communication, where at least one priority level is unique to I2V communication.

Figure 2:
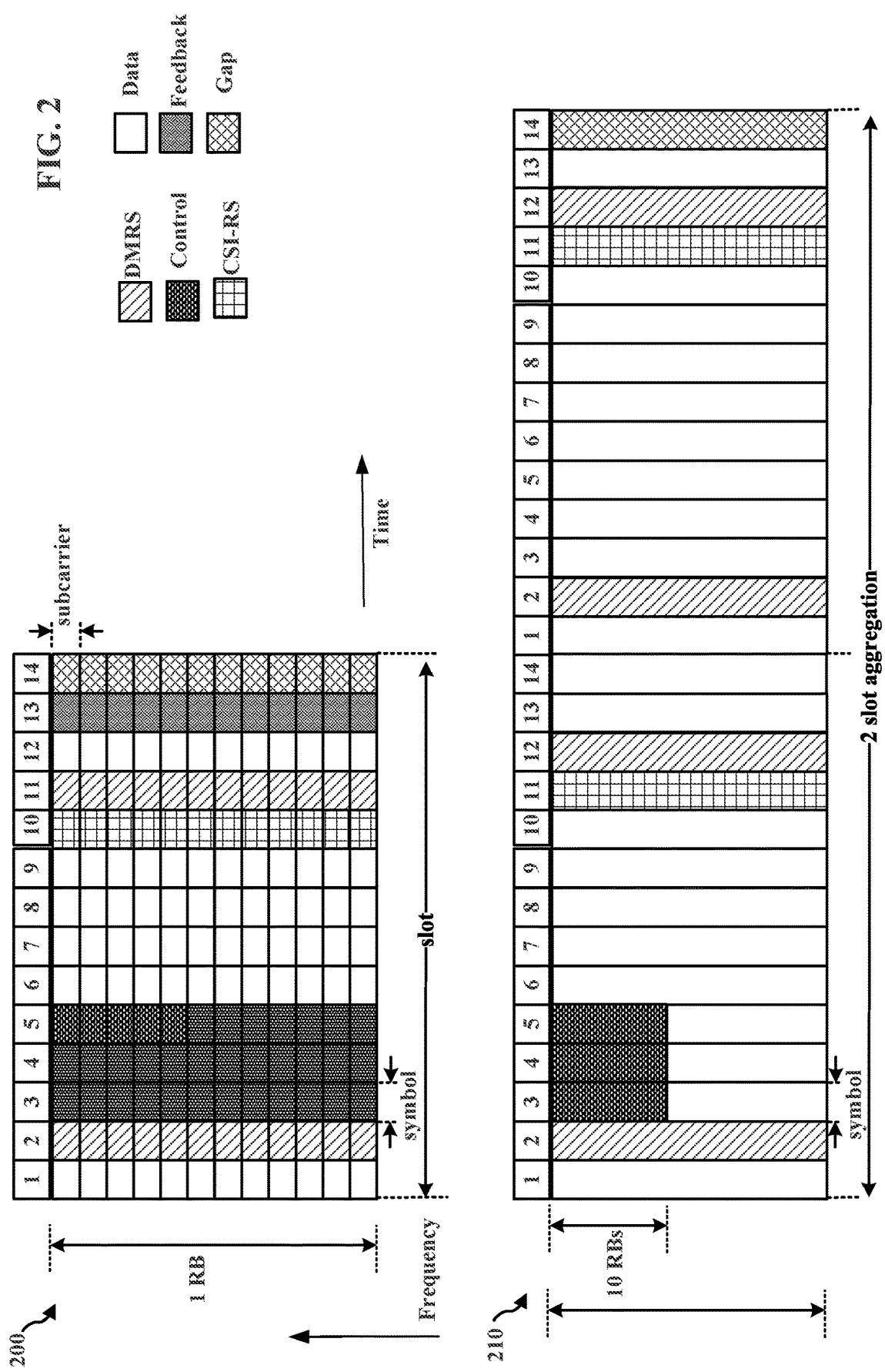
FIG. 2 illustrate example aspects of a sidelink slot structure.

FIG. 2 illustrates example diagrams 200 and 210 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms).

Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
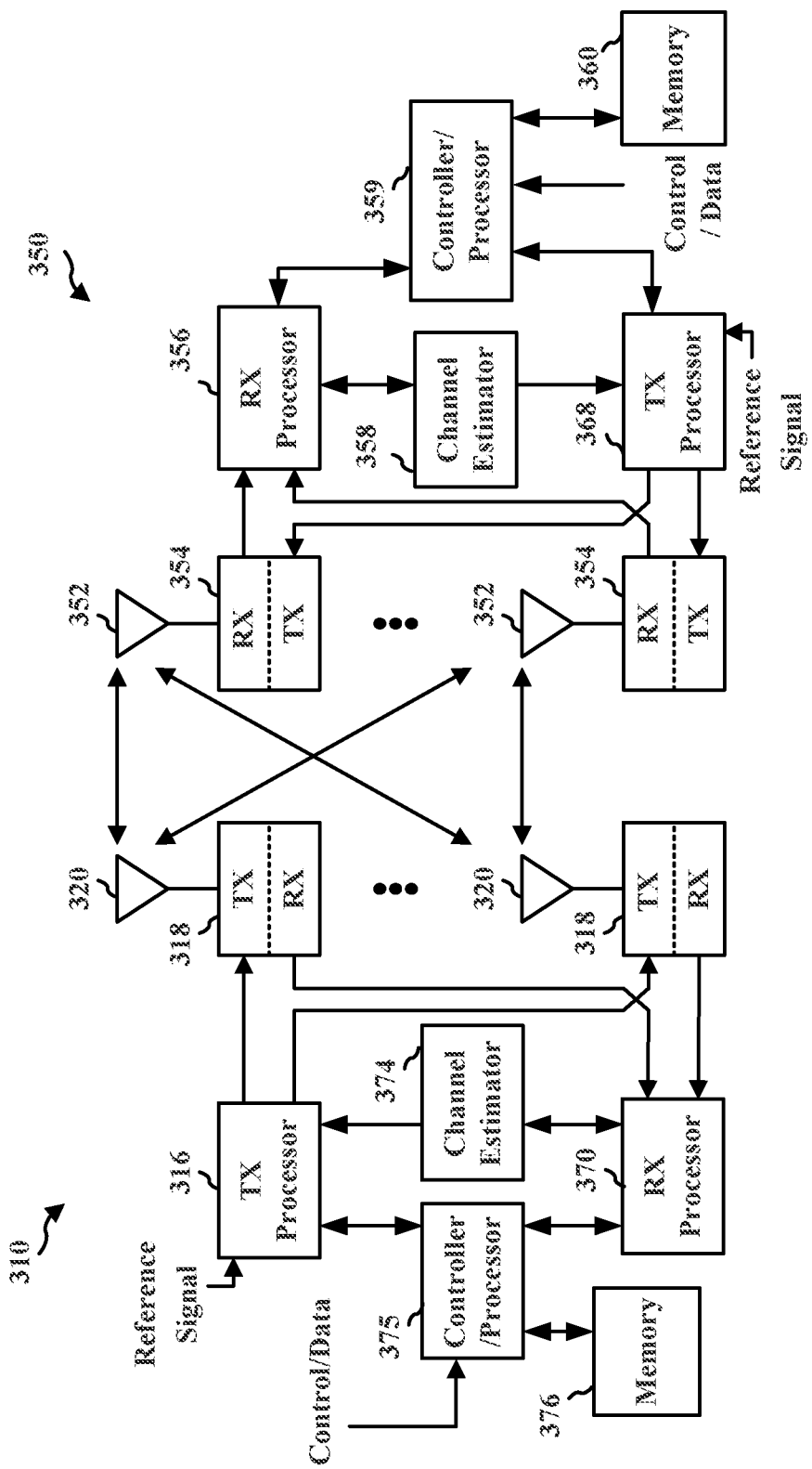
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with dynamic resource sharing component 198 of FIG. 1.

Figure 4:
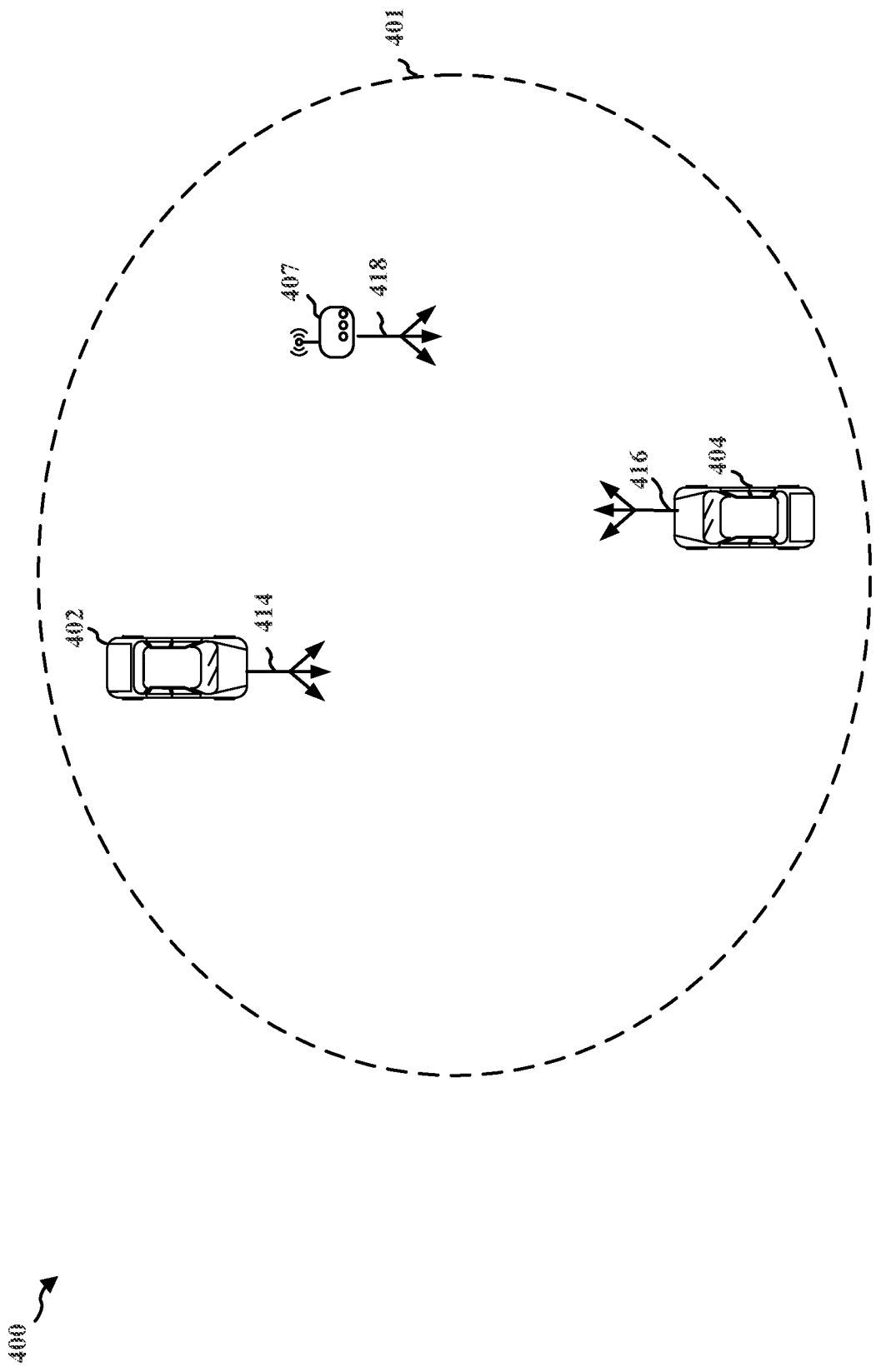
FIG. 4 is a diagram illustrating an example of wireless communication between devices based on V2X/V2V/D2D communication.

FIG. 4 illustrates an example 400 of wireless communication between devices based on V2X/V2V/D2D communication. The communication may be based on a slot structure comprising aspects described in connection with FIG. 2. As a part of such communication, for example, first UE 402 may transmit a transmission 414, e.g., comprising a control channel and/or a corresponding data channel, that may be received directly by second UE 404, e.g., based on a PC5 interface. A control channel may include information for decoding a data channel and may also be used by a receiving device (e.g. second UE 404) to avoid interference by refraining from transmitting on the occupied resources during a data transmission. The number of TTIs, as well as the RBs that will be occupied by the data transmission, may be indicated in a control message from a transmitting device (e.g. first UE 402). The first and second UE may each comprise a vehicle user equipment (VUE), for example. The UEs 402, 404 may each be capable of operating as a transmitting device in addition to operating as a receiving device. Thus, UE 404 is illustrated as transmitting a transmission 416. In addition to receiving communication from UE 404, the UE 402 may also transmit or receive communication from other devices. The transmissions 414, 416 may be broadcast or multicast to nearby devices. For example, UE 402 may transmit communication intended for receipt by other UEs within a range 401 of UE 402. The UEs 402, 404 may also be capable of communicating using unicast. Additionally/alternatively, RSU 407 may receive communication from and/or transmit communication (e.g. a transmission 418) to UEs 402, 404. V2X capable devices may also have or maintain a communication link with a wide area network such as a cellular network.

UE 402, 404 or RSU 407 may comprise a dynamic resource sharing component, similar to 198 described in connection with FIG. 1.

Figure 5:
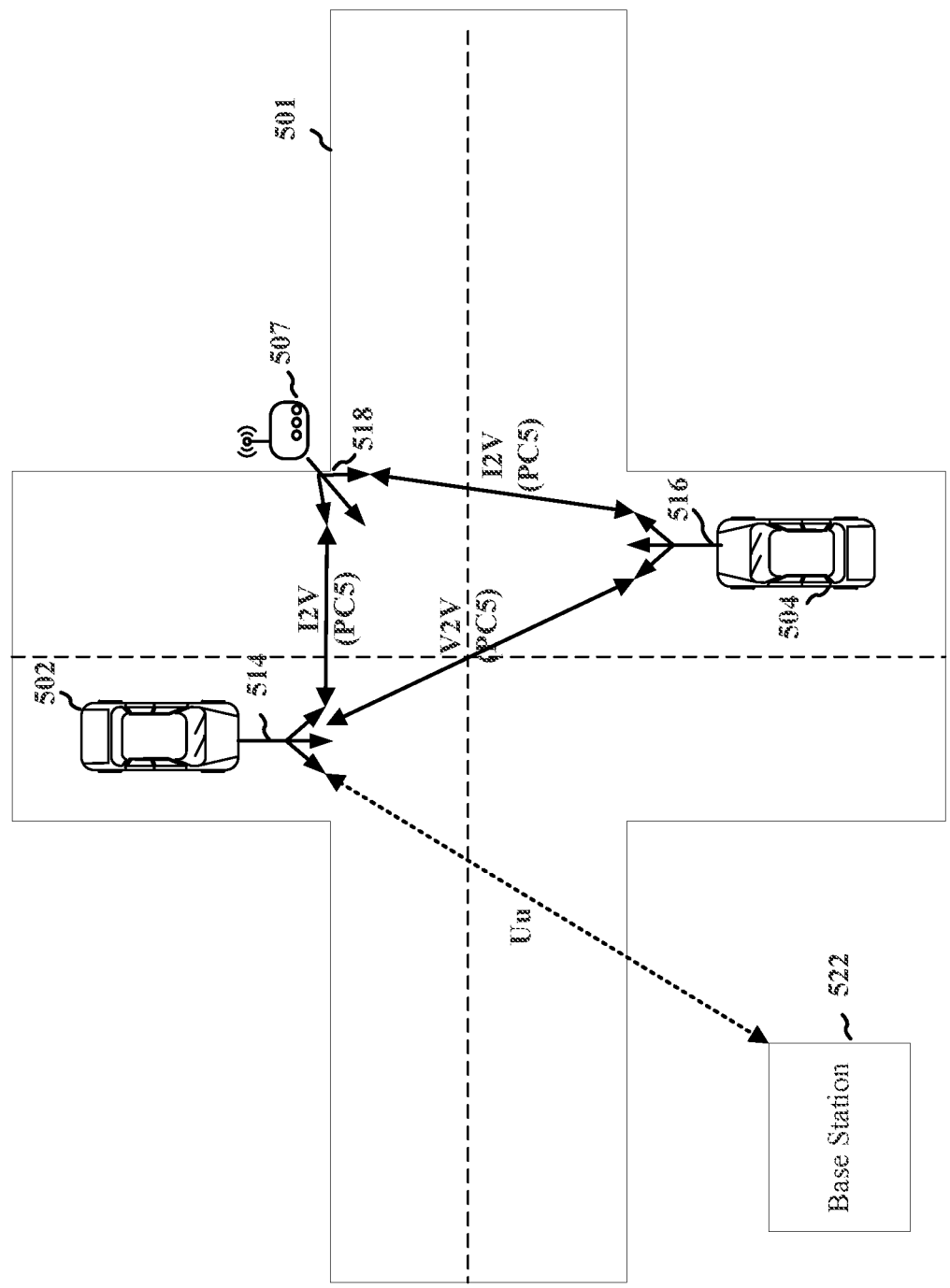
FIG. 5 is a diagram illustrating an example of wireless communication between devices at an intersection based on V2X/V2V/D2D communication.

FIG. 5 illustrates an example 500 of V2X communications that may also include I2V communication in addition to V2V communication, or other UE originated communication based on PC5. FIG. 5 illustrates an example of an RSU 507 that is positioned at an intersection 501. V2X communications includes different types of traffic depending on the source, e.g., UE originated communication such as V2V, V2I, or other D2D communication, and infrastructure to vehicle (I2V) communication. FIG. 5 illustrates examples of vehicle originated communication in which a vehicle (e.g. UE 502, 504) communicates (e.g. via transmissions 514, 516) with other vehicles over a PC5 interface, while I2V communication 518 is transmitted by an infrastructure device (e.g. Road-side unit (RSU) 507) to be received by vehicles and/or other UEs over the PC5 interface. V2V communications may be used, for example, for vehicles to inform nearby vehicles of intent (e.g. a lane change), and I2V communications may be used, for example, to provide safety messages to the vehicles. For example, a RSU may comprise sensors or receive information from sensors that provides information regarding the surrounding area and traffic. The RSU may provide such information to vehicles and other UEs within range of the RSU.

In I2V communications, an infrastructure may manage different traffic needs depending on the services the infrastructure is configured to provide. For example, RSU 507 may be strategically located at intersection 501 to collect data from vehicles 502, 504 passing through the intersection and to sense environmental conditions using onboard sensors. Based on this data and sensors, the RSU 507 may broadcast information (e.g. a nearby accident or a crossing pedestrian) over the PC5 interface to the vehicles 502, 504 driving towards the intersection, which in turn may communicate this information to other vehicles. The RSU and vehicles can thus transmit and receive information without the need to communicate with the cellular network (e.g. the base station 522).

In order to maintain resources in time and frequency for I2V communication, the available resources may be separated into separate resource pools, with one resource pool reserved for I2V communication. However, I2V and V2V traffic may vary over time, location, and the type of services performed. Thus, while such a partition of resources may ensure that I2V communication has available resources, the partition may lead to wasted resources. For example, an RSU (e.g. RSU 507) may communicate safety messages more frequently to vehicles (e.g. UE 502, 504) in an intersection depending on varying circumstances (e.g. during rush hour, in response to an accident at an intersection, and the like), while vehicles in V2V communications may communicate general messages (e.g. passing lane changes) in a more constant manner. V2V communication levels may similarly vary depending on the amount of vehicles in the area, e.g., in a more densely populated area or during high traffic times of day. Therefore, I2V and V2V communications may differ in channel usage over the PC5 interface. If a set of wireless resources are set aside for I2V communication, the reserved resources may be wasted in areas without an RSU or during times when an RSU does not transmit many messages.

A dynamic I2V and V2V resource partitioning may be used to enable more efficient use of resources than static resource partitioning and may account for variations in channel usage. The present disclosure provides for dynamic resource sharing between V2V and I2V communications according to various aspects. Advantageously, aspects of the present disclosure enable efficient bandwidth usage for allocating resources to I2V and V2V traffic, while being fair in prioritizing I2V or V2V traffic. Guaranteed resources may be provided for I2V communication when needed, thus allowing an operator of the RSU to be assured that resources will be provided for I2V usage without the need for the infrastructure to compete with vehicles over resources. Support is also provided for vehicles which may only communicate over the PC5 interface (e.g. UE 504), without the need for cellular networks (e.g. communicating with base station 522). Resource sharing may be optimized for I2V and V2V traffic varying based on time, location, and type of services the RSU is configured to perform, with aspects also being forward compatible and scalable to deployment.

In one aspect, at least one priority level may be used uniquely for I2V communication. The priority level may be a ProSe Per-Packet Priority (PPPP) level that is designated for only I2V communication, e.g., by an RSU. Unique PPPP level(s) may be allocated only for use by the RSU to prioritize resources for important I2V communications over lower priority V2V communications. An associated energy threshold with the PPPP level(s) may also be set smaller than the other PPPP levels used for V2V messages to guarantee RSU resource reservation. In another aspect, a maximal resource reservation for I2V communications may be considered to prevent deprivation of resources for V2V communications. For example, a maximal resource limit (e.g. a channel occupancy ratio (CR) limit) may be separately set for I2V traffic associated with PPPP levels defined only for I2V communications and for I2V traffic associated with any PPPP level which may also be used for V2V communications (e.g. total infrastructure traffic). In a further aspect, congestion control parameters may be set differently when vehicles detect I2V traffic and when vehicles do not detect I2V traffic. For example, each PPPP level may have a corresponding CR limit, and the CBR calculation may be different depending on whether the vehicle detects the RSU.

Figure 6:
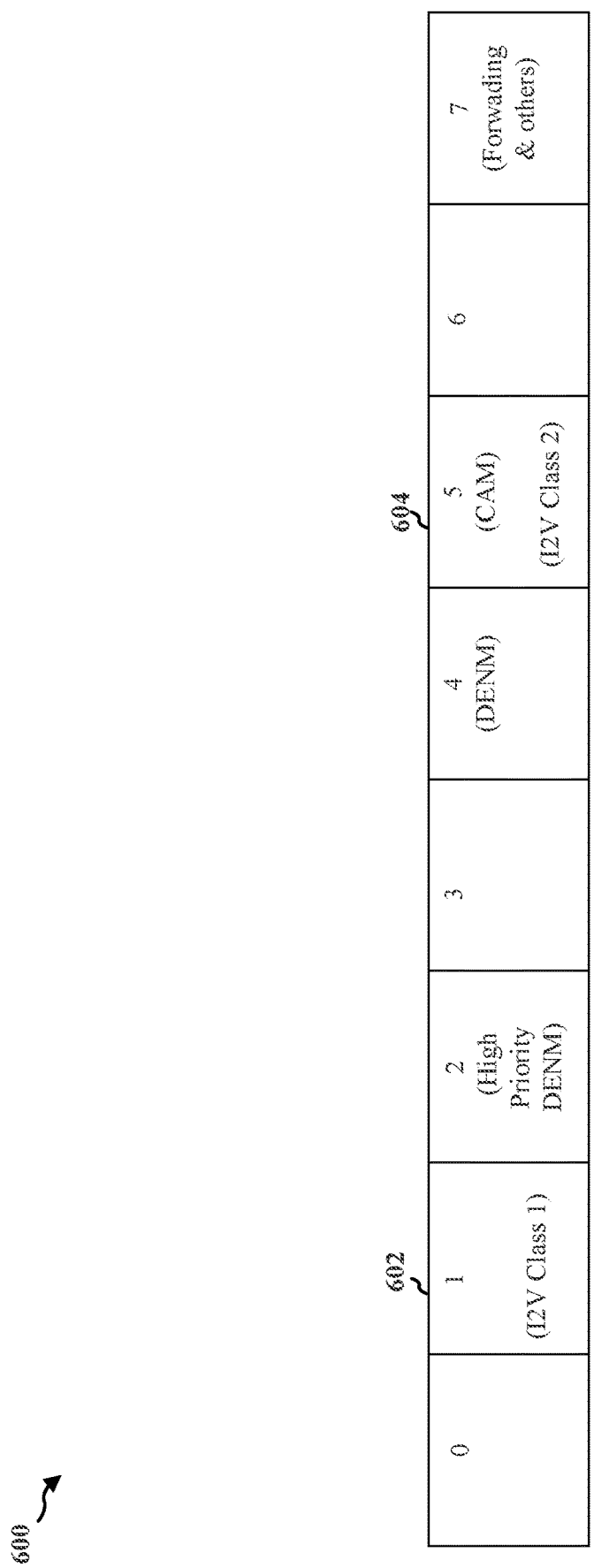
FIG. 6 is a diagram of ProSe Per-Packet Priority (PPPP) levels that may be used in V2X communications.

FIG. 6 illustrates a diagram of ProSe Per-Packet Priority (PPPP) levels 600 used in V2X communications. In V2X, a packet priority for a communication (e.g. transmissions 514, 516, 518 in FIG. 5) may be mapped to one of a predefined set of PPPP levels 600. The lower the PPPP level, the higher the priority of the message. Certain PPPP levels may be allocated for V2V traffic. For example, FIG. 6 illustrates an example set of eight PPPP levels in which levels 2, 4, 5, and 7 may be defined for V2X traffic. For instance, a High Priority Decentralized Environmental Notification Message (DENM) may be assigned PPPP level 2, DENM may be assigned PPPP level 4, Co-Operative Awareness Message (CAM) may be assigned PPPP level 5, and forwarding and other messages may be assigned PPPP level 7. Certain levels may be unused.

In one aspect, dynamic resource sharing may be accomplished through resource prioritization and resource reservation by using a PPPP level reserved for I2V communication. For example, referring to FIG. 6, PPPP level 1 602 may be defined for I2V traffic. Other PPPP level(s) may be defined for combinations of I2V and V2V communication. For instance, PPPP level 5 604 may be defined for CAM and I2V traffic. The use of one or more priority levels uniquely for I2V communication enables resource reservation and prioritization to be achieved for I2V messages, e.g., without the need to compete with other V2V traffic for certain priority levels. For instance, in the example mapping of PPPP levels in FIG. 6, class 1 I2V traffic may have guaranteed resources for I2V messages, while class 2 I2V traffic may compete for resources with V2V CAM messages.

Through the use of a PPPP level for I2V-only traffic, resource prioritization may be obtained for I2V messages, e.g., by placing higher CR limits on I2V resources than V2V resources. For example, a CR limit may be set to limit lower-priority V2V traffic with higher PPPP levels in order to prioritize I2V messages having a lower PPPP level. For example, a CR limit for a priority level associated with V2V traffic may be set lower than a CR limit for higher-priority I2V traffic. For instance, a higher CR limit, e.g., a maximum CR limit, may be applied for an I2V only PPPP level, such as PPPP level 1 602 in FIG. 6. In another example, a higher CR limit, e.g., a maximum CR limit, may be applied for any I2V traffic, e.g., including traffic for PPPP level 1 and PPPP level 5 604 (or other PPPP level where I2V traffic is shared with V2V traffic). In another example, an RSU may have the ability to select a PPPP level for an I2V message. Thus, by selecting or otherwise controlling the PPPP level of I2V traffic that it transmits, an RSU may dynamically manage the amount of channel portion to be utilized (CR limit) by I2V messages in relation to V2V communication. The use of a PPPP level reserved for I2V communication, and which has a higher priority level than V2V communication, enables the RSU to have guaranteed resources for its I2V transmissions without having to compete with the V2V traffic.

Moreover, according to this aspect, an energy threshold corresponding to a priority level reserved for I2V communications may be smaller than an energy threshold corresponding to priority levels for V2V communications. For example, one or two high priority PPPP levels that are allocated for I2V-only traffic (e.g. PPPP level 1 in FIG. 6) may have a corresponding energy threshold that is substantially smaller than the energy thresholds corresponding to the other PPPP levels used for V2V traffic. For example, an RSRP threshold such as a PSSCH RSRP threshold (e.g., identified as SL-ThresPSSCH-RSRP or another name) for a PPPP level that is reserved for I2V messages may be substantially smaller than a PSSCH RSRP threshold for other PPPP levels used by V2V traffic. For instance, the RSRP threshold for I2V-only PPPP levels may even be significantly lower than a thermal noise level. Thus, regardless of how busy or not the channel is from V2V traffic (e.g. low vehicle channel occupancy), a UE may not be able to autonomously select a resource associated with the I2V-only PPPP level(s) for V2V traffic due to the smaller energy threshold. The result effectively excludes that resource for V2V traffic and reserves the resource for I2V traffic. That is, since the UE may exclude resources from autonomous selection if a PSSCH RSRP in the associated data resource is above the RSRP threshold, the likelihood of exclusion may increase for lower RSRP thresholds, and therefore the vehicle/UE may not autonomously select resources that are used for I2V messages due to the lower RSRP threshold.

Figure 7:
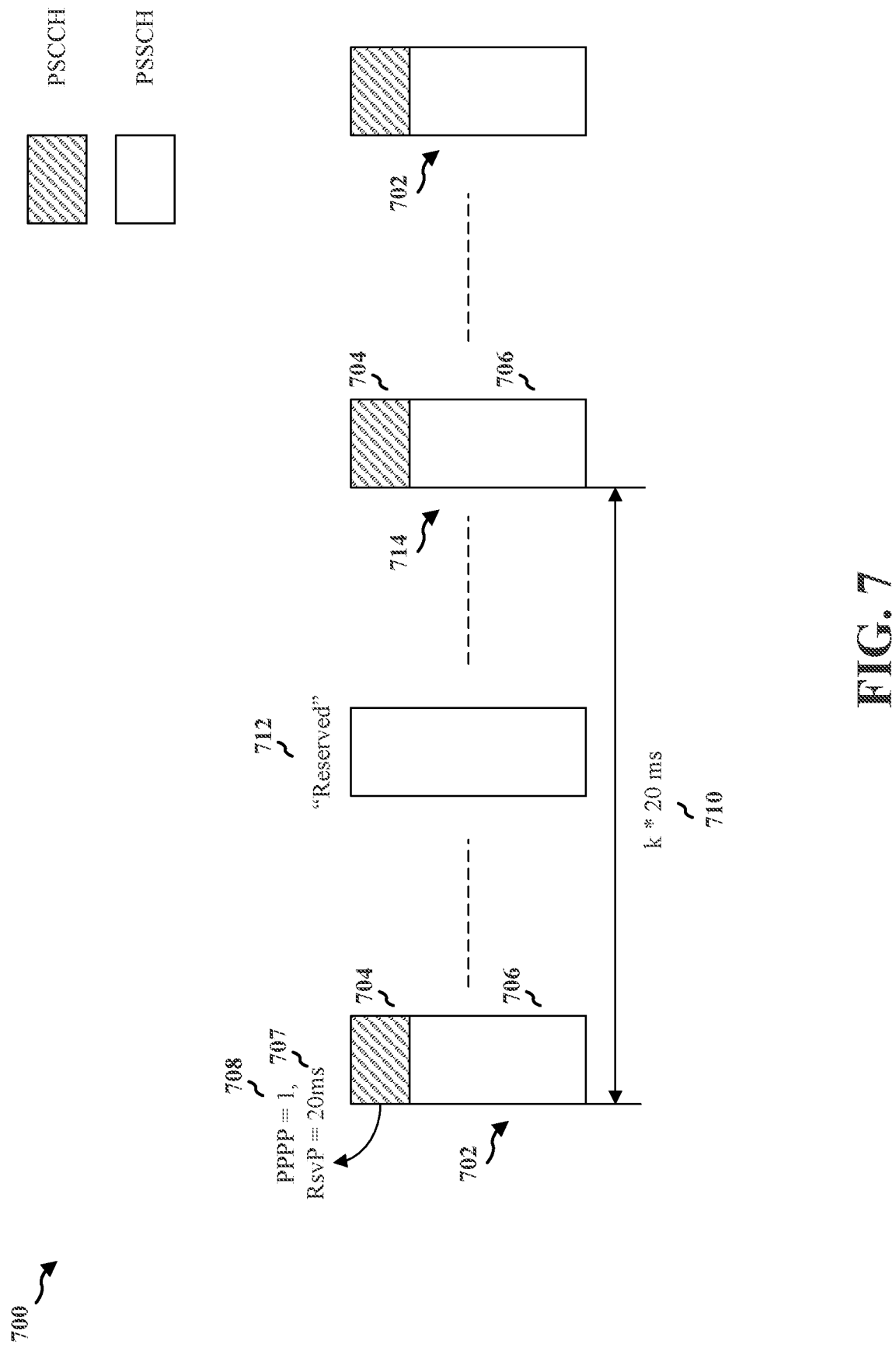
FIG. 7 is a diagram of resource reservation in accordance with aspects of the present disclosure.

FIG. 7 illustrates an example diagram 700 of resource reservation for shared resources as described herein. An RSU can transmit messages 702 to reserve resources for I2V traffic using a resource reservation period. Messages 702 may include a control channel 704 (e.g. PSCCH) and a data channel 706 (e.g. PSSCH) associated with the control channel 704. The control channel 704 identifies a resource reservation period 707, for example, 20 ms, and a PPPP level 708, for example, PPPP level 1, which is reserved for I2V communication. Thus, each PSCCH may include an indication of the priority (e.g., PPPP level) and the resource of the associated data transmission (PSSCH) as well as the resource reservation period.

The resource reservation period 707 tells other devices that the same frequency resource in a current subframe is reserved for the transmitter in certain future subframes. When a transmitting device (e.g., vehicle or RSU) performs resource selection for a current PSSCH transmission and/or future PSSCH transmissions, the device may consider a previous PSCCH. The transmitting device may determine, for each of the future subframes, whether a resource is to be reserved and, if reserved, the associated PPPP level. The device may also determine the RSRP measured for the same frequency resource in previous reserved subframes. The device may then decide whether a future resource may be used or not by comparing the RSRP of the same resource in previous subframes during the same resource reservation period with an RSRP threshold. The RSRP threshold may be a function of the PPPP level indicated in the control channel of the existing reservation and the PPPP level of data that the device will transmit.

The periodicity 710 of message 702 may be a multiple, k, of the resource reservation period 707; for example, where k is 5 and the resource reservation period is 20 ms, the periodicity 710 may be 100 ms. During this resource reservation period 707 or within periodicity 710, the RSU may transmit one or more reservation messages 712 indicating that it reserved the resource in one or more of the subframes between message 702 and subsequent message 714. For example, the message 712 may be a dummy message sent by the RSU using the corresponding PPPP level 708 and the resource reservation period 707 (e.g., identified as restrictResourceReservationPeriod or another name) indicated in the PSCCH 704 of message 702. The periodicity 710 of the actual messages may be larger than the declared resource reservation period 707 indicated in the PSCCH. As a result of the indicated resource reservation, a UE may not autonomously select the reserved resource during this time frame for V2V traffic due to the reservation by the RSU, as well as due to the smaller energy threshold associated with PPPP level 708.

In another aspect, dynamic resource sharing may be accomplished through congestion control. Different congestion control parameters for vehicles may be defined depending on whether the vehicle is within communication range of the RSU (e.g. the UE detects the RSU) or outside of communication range of the RSU. Such congestion control parameters may be preconfigured in the UEs and/or signaled to the UEs by the RSU. For example, where an RSU is transmitting a basic safety message (BSM) having a PPPP level that is reserved for I2V communication within communication range of a UE (e.g. the UE detects the BSM from the RSU), a CR limit for the BSM may be unlimited when the channel busy ratio (CBR)<0.6. However, if the RSU is outside of communication range of the UE (e.g. the UE does not detect any I2V messages), the CR limit for the BSM may be unlimited only when the CBR<0.3. Thus, more resources for I2V may be reserved for I2V communication by vehicles that detect messages from an RSU, and thus are more likely to receive I2V messages, than for vehicles who do not detect the RSU. The examples of 0.3 and 0.6 for CBR are merely examples used to illustrate the concept of applying different congestion control parameters depending on whether the UE detects an I2V message or a message having a PPPP that is reserved for I2V communication. The set of congestion control parameter(s) may comprise CR limits and other transmit parameter(s) that may take different values depending on CBR.

Alternatively or additionally, when making calculations for the congestion parameter(s), e.g., when calculating CBR, resources reserved for I2V communication may be excluded from the calculation. Shared PPPP levels may be used for I2V and V2V communication, e.g., PPPP level 5 in FIG. 6. The reserved resources associated with I2V-only PPPP levels (e.g. PPPP level 1 in FIG. 6) may be excluded when calculating CBR for congestion control. For example, referring again to FIG. 7 and assuming PPPP level 708 is I2V-only, if the RSU's reserved resource between message 702 and subsequent message 714 amount to 20% of the resources or subframes utilized in the channel, then UEs may base their selection of resources for V2V communication on a CBR calculated within the remaining 80% of the resources or subframes.

Figure 8:
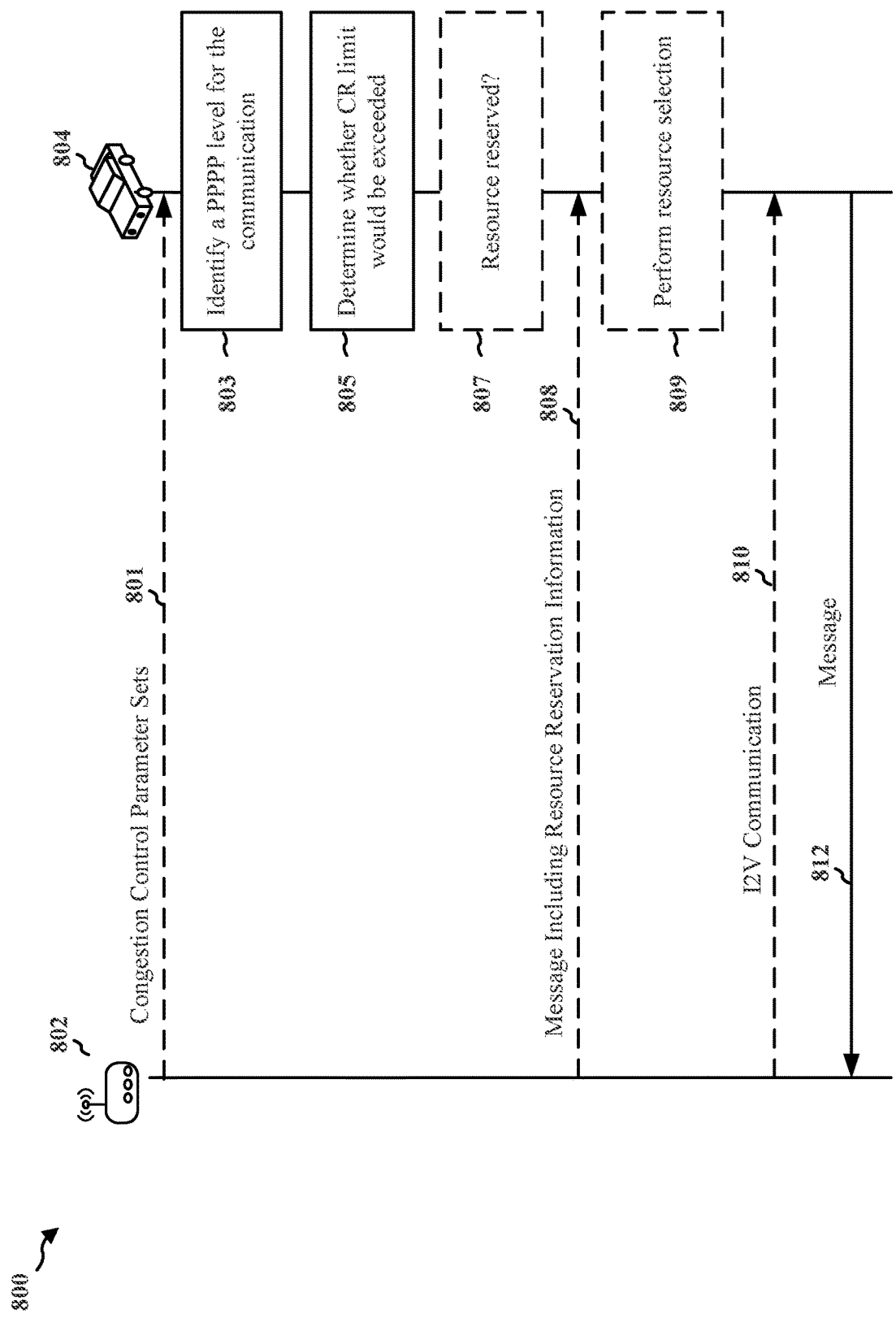
FIG. 8 is a diagram of an example communication flow between an RSU and UEs according to aspects of the present disclosure.

FIG. 8 illustrates an example communication flow 800 between an RSU 802 and UE 804. The communication may include I2V communication from the RSU, and PC5 communication originating from the UEs, e.g., V2V communication between the UEs. As an example, RSU 802 may be located at an intersection (e.g. intersection 501 in FIG. 5), and UE 804 may be approaching the intersection where the RSU is located (e.g. UEs 502, 504 in FIG. 5). The communication transmitting from RSU 802 or UE 804 may be broadcast and received by multiple receiving devices within range of a particular transmitting device, as described in connection with FIG. 4.

When a UE 804 has a message to transmit, the UE determines an associated PPPP level for the message, e.g., at 803. The UE 804 determines whether a CR limit would be exceeded if the UE chooses to transmit the message, e.g., at 805. If transmission of the message would exceed the limit, the UE 804 may refrain from transmitting the message for a time. If the CR limit would not be exceeded, the UE 804 determines whether a resource is already reserved for the communication, at 807, or whether resource selection is required. For example, a resource may already be reserved based on the UE reserving a periodic resource for a certain period of time. If the UE 804 does not have a reserved resource, the UE 804 may select a resource, e.g., a frequency and time resource, based on a number of conditions. If a resource is reserved and reselection is not required, the UE 804 may transmit the message 812 using the resource. If not, the UE 804 may proceed to perform resource selection, at 809. The resource may be selected from a shared resource pool for I2V communication and V2V communication.

As a part of resource selection, at 809, the UE 804 may rank a resource within a certain time window (e.g., the time window being based on a delay requirement of the message). The ranking of the resource may be based on an RSRP threshold and a measured RSRP of the previous subframes of a reservation that includes the resource to be considered. The UE 804 may then transmit the message at 812, e.g., using the selected resource.

As an example of resource selection, a UE 804 may first attempt to find the best resources (e.g. at least 20% of possible resources for V2V communication) within a certain time window. To find the best resources, for each resource, the UE 804 may compare the measured RSRP with an RSRP threshold as described herein. If the measured RSRP is larger than the RSRP threshold, the resource is excluded. After considering all the resources within the window, if the remaining resources are less than 20%, the UE 804 may increase the RSRP threshold by 3 dB, and perform resource selection again. The above process may be repeated until at least 20% of the resources within the time window are left in the selection pool based on the measured RSRP. Then, the UE 804 may randomly select a resource from remaining resources that have a measured RSRP below the RSRP threshold. Thus, the RSRP threshold for a PPPP level I2V communication, e.g., 810, may cause the UE to choose resources that are either not reserved or reserved by other PPPP levels than the I2V PPPP level. As described in connection with FIG. 7, the UE 804 may receive a resource reservation message 808 (e.g. message 702) from RSU 802. A resource reservation message may comprise a control channel that identifies a resource reservation period and a PPPP level for I2V messages.

As noted above, the UE 804 may determine, at 805, whether to transmit a message (e.g. message 812) by checking whether CR limits associated with the priority level of the message and CR limits of all higher priority level messages of the UE 804 will be violated if the UE 804 transmits the message. By transmitting a message, the channel usage of the UE is increased. CR limits may be set to limit V2V lower priority traffic in order to prioritize I2V messages. In one example, RSU 802 may manage resource sharing by controlling the PPPP levels of its I2V messages.

Different congestion control parameter sets can be defined depending on whether the UE 804 detects I2V communication. The sets of congestion control parameters may include CR limits and may comprise other transmit parameter(s) that may take different values depending on a CBR. Such congestion control parameter sets may be pre-configured or may be signaled to the UE 804, e.g., as illustrated at 801.

Thus, the UE 804 may determine whether to transmit the V2V message (e.g. message 812) based on a congestion control parameter set depending on whether or not the UE 804 is within communication range of the RSU 802. In one example, if UE 804 detects I2V communication from the RSU 802 (e.g. the UE 804 is close to or within the intersection of the RSU), then the UE may apply a CR limit, at 805, that is unlimited when the CBR<a first value (e.g. 0.6). However, if the RSU is outside of communication range of the UE (e.g. the UE does not detect I2V communication from the RSU), the UE 804 may apply an unlimited CR limit when the CBR<a second value (e.g. 0.3). The second value may be smaller than the first value in order to allow more resources to be reserved for I2V communication by vehicles that detect messages from an RSU than for vehicles who do not detect the RSU.

Figure 9:
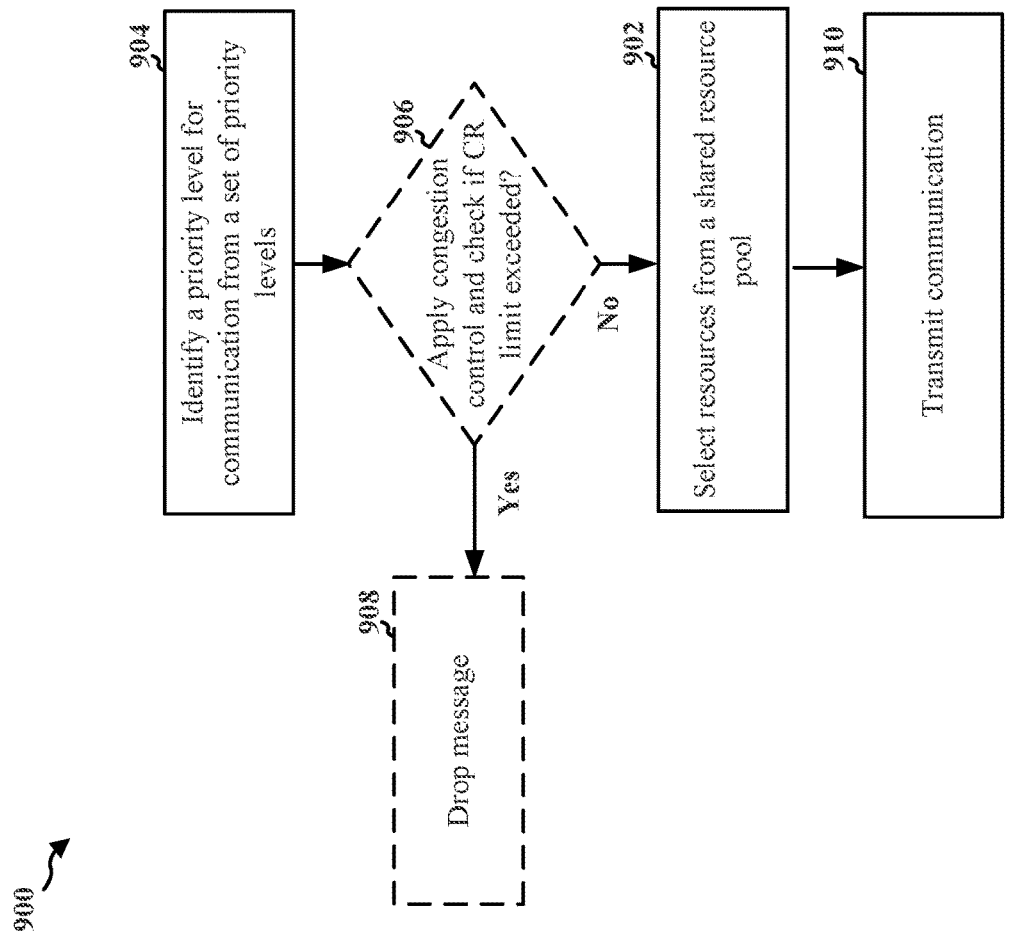
FIG. 9 is a flowchart of a method of wireless communication.

FIG. 9 is a flowchart 900 of a method of wireless communication. The method may be performed by a wireless device (e.g., the RSU 507, 802, the UE 104, 350, 402, 404, 502, 504, 804, the apparatus 1002/1002'; the processing system 1114, which may include memory 360, 376 and which may be the entire RSU or UE or a component of the RSU or UE, such as TX processor 316, the RX processor 370, and/or the controller/processor 375 or TX processor 368, the RX processor 356, and/or the controller/processor 359). In an example, a UE performing the method may comprise a VUE. Optional aspects are illustrated with dashed lines. The method provides for dynamic resource sharing of I2V and V2V communication in a single resource pool.

At 902, the wireless device may select resources from a shared resource pool in frequency and time to identify a message to be transmitted. For example, 902 may be performed by resource selection component 1006 from FIG. 10. The shared resource pool may be shared for Infrastructure-to-Vehicle (I2V) communication and communication over a PC5 interface originating from a UE (e.g., V2V, V2I, D2D, etc.). The I2V communication may be transmitted by a RSU. For example, referring to FIG. 8, the RSU 802 may select resources (e.g. the resource elements illustrated in FIG. 2) for I2V communication from a single, shared resource pool for I2V and V2V communication by sending a resource reservation message 808. Similarly, the UE may select resources for V2V communication from the shared resource pool for I2V and V2V communication.

At 904, the wireless device identifies a first priority level for communication from a set of priority levels for I2V communication and UE originated communication. For example, 904 may be performed by priority level identification component 1008 from FIG. 10. In one aspect, the set of priority levels comprises at least one priority level unique to the I2V communication. A probability of selecting a resource for the communication may be based at least in part on the first priority level identified for the communication and a second priority level that reserves at least a part of the resource if any part of the resource is reserved. In another aspect, the set of priority levels comprises a set of PPPP levels, e.g., as described in connection with FIG. 6. For example, referring to FIG. 6, the wireless device may identify a first priority level (e.g. PPPP level 1 602) for communication from a set of PPPP levels 600. PPPP level 1 602 may be defined for I2V traffic. Moreover, a second priority level (e.g. PPPP level 5 604) may be indicated in a control channel 704 of a resource reservation message 702 (e.g. as PPPP level 708). A probability of selecting a resource (e.g. at 809 in FIG. 8) for the communication may be based on the different priority levels. For example, the probability of selecting the resource for V2V communication may be lower, and for I2V communication may be higher, for resources associated with PPPP level 1 602 than for resources associated with PPPP level 5 604 based on the aspects described above.

At 906, the wireless device may determine whether to transmit the communication. The determination may be based on a CR limit, e.g., as described in connection with 805 in FIG. 5. For example, 906 may be performed by determination component 1010 from FIG. 10. For instance, the device may check whether CR limits associated with the priority level of the message and CR limits of all higher priority level messages of the device will be violated if the device transmits the message. If so, the UE may drop the message, at 908 (e.g., may refrain from transmitting the message for a time period or wait for another opportunity). If not, the device may determine to continue to resource selection, e.g., in order to transmit the message at 910.

A first priority level that is unique to the I2V communication may be associated with a higher CR limit, and a second priority level allocated to UE originated communication may be associated with a lower CR limit. In one aspect, the first priority level that is unique to the I2V communication may be associated with a maximum CR limit. For example, referring to FIG. 6, a CR limit may be set to limit lower-priority V2V traffic with higher PPPP levels in order to prioritize I2V messages having a lower PPPP level. For example, a CR limit for a priority level associated with V2V traffic may be set lower than a CR limit for higher-priority I2V traffic. For instance, a higher CR limit, e.g., a maximum CR limit, may be applied for an I2V only PPPP level, such as PPPP level 1 602 in FIG. 6. In another aspect, the wireless device may comprise a RSU, and the RSU may select the priority level for the communication. For example, referring to FIG. 6, an RSU may have the ability to select a PPPP level for an I2V message.

As a part of resource selection, e.g., at 902, the wireless device may consider a previous PSCCH. For instance, referring to FIG. 7, the wireless device may determine, for each of the future subframes, whether a resource is reserved and, if reserved, the PPPP level 708. The wireless device may also determine the RSRP measured for the same frequency resource in previous reserved subframes. The vehicle may then decide whether a future resource may be used or not by comparing the RSRP of the same resource in previous reserved subframes during the same resource reservation period with an RSRP threshold. The RSRP threshold may be a function of the PPPP level indicated in the control channel 704 of the existing reservation and the PPPP level of data that the wireless device will transmit.

In one aspect, the wireless device may determine whether to transmit the communication further based on a Reference Signal Received Power (RSRP) threshold. For example, the wireless device may determine whether to select a resource based on at least whether a RSRP threshold associated with a receive priority level that is associated with a reservation that includes at least a part of the resource and the identified first priority level of the communication is larger than a measured RSRP of a previous resource included in the reservation. For example, referring to FIG. 6, the wireless device may determine whether to select a resource (e.g. at 809 of FIG. 8) based on an energy threshold corresponding to a priority level associated with that reserved resource (e.g. at 807 of FIG. 8). Moreover, referring to FIG. 7, the transmitting device may determine, for each of the future subframes, whether a resource is to be reserved and, if reserved, the associated PPPP level. The device may also determine the RSRP measured for the same frequency resource in previous reserved subframes. The device may then decide whether a future resource may be used or not by comparing the RSRP of the same resource in previous subframes during the same resource reservation period with an RSRP threshold. The RSRP threshold may be a function of the PPPP level indicated in the control channel of the existing reservation and the PPPP level of data that the device will transmit.

In this aspect, for each transmit priority level, a smaller RSRP threshold may be associated with a first receive priority level that is unique to the I2V communication and a larger RSRP threshold may be associated with a second priority level for UE originated communication. Moreover, the smaller RSRP threshold associated with the first receive priority level that is unique to the I2V communication may be smaller than RSRP thresholds for each receive priority level of the set of priority levels that is allocated to at least one of the UE originated communication or the I2V communication. For example, referring to FIG. 6, one or two high priority PPPP levels that are allocated for I2V-only traffic (e.g. PPPP level 1 in FIG. 6) may have a corresponding energy threshold that is substantially smaller than the energy thresholds corresponding to the other PPPP levels used for V2V traffic. For example, an RSRP threshold such as a PSSCH RSRP threshold (e.g., identified as SL-ThresPSSCH-RSRP or another name) for a PPPP level that is reserved for I2V messages may be substantially smaller than a PSSCH RSRP threshold for other PPPP levels used by V2V traffic.

In a further aspect, the wireless device may further determine, at 906, whether to transmit the communication based on a set of congestion control parameters. The set of congestion control parameters may comprise CR limits and at least one other transmit parameter that has a value depending on a Channel Busy Ratio (CBR), such as a modulation and coding scheme (MCS) and/or a number of allowed retransmissions. In this aspect, the wireless device may comprise a UE. The UE may apply a first set of congestion control parameters if the UE detects the I2V communication, and the UE may apply a second set of congestion control parameters if the UE does not detect the I2V communication. For example, referring to FIG. 8, the UE may determine whether to transmit the communication (e.g. at 805 of FIG. 8) depending on congestion control parameters (e.g. CR limits, MCS, etc.) for vehicles that may be defined differently based on whether the vehicle is within communication range of the RSU (e.g. the UE detects the RSU) or outside of communication range of the RSU. For instance, where an RSU is transmitting a basic safety message (BSM) having a PPPP level that is reserved for I2V communication within communication range of a UE (e.g. the UE detects the BSM from the RSU), the UE may apply an unlimited CR limit for the BSM when the CBR<0.6. However, if the RSU is outside of communication range of the UE (e.g. the UE does not detect any I2V messages), the UE may apply an unlimited CR limit for the BSM only when the CBR<0.3.

In another aspect, the UE may calculate the CBR for a subset of resources other than I2V reserved resources associated with the at least one priority level unique to the I2V communication. For example, referring to FIG. 7, when making calculations for the congestion parameter(s), e.g., when calculating CBR, resources reserved for I2V communication may be excluded from the calculation. Shared PPPP levels may be used for I2V and V2V communication, e.g., PPPP level 5 in FIG. 6. The reserved resources associated with I2V-only PPPP levels (e.g. PPPP level 1 in FIG. 6) may be excluded when calculating CBR for congestion control. For example, assuming PPPP level 708 is I2V-only, if the RSU's reserved resource between message 702 and subsequent message 714 amount to 20% of the resources or subframes utilized in the channel, then UEs may base their selection of resources for V2V communication on a CBR calculated within the remaining 80% of the resources or subframes.

At 910, the wireless device may transmit the communication in the shared resources. For example, 910 may be performed by transmission component 1020 from FIG. 10. For example, if the wireless device is an RSU, the wireless device may transmit I2V communication (e.g. I2V communication 810 in FIG. 8). If the wireless device comprises a UE (e.g. a vehicle UE), the wireless device may transmit V2V, V2I, etc. communication (e.g. message 812 in FIG. 8).

The RSU may also transmit a resource reservation message comprising a control channel indicating a resource reservation period. For example, referring to FIG. 7, the RSU may transmit a message 702 including a control channel 704 to reserve resources for I2V traffic using a resource reservation period 707.

Figure 10:
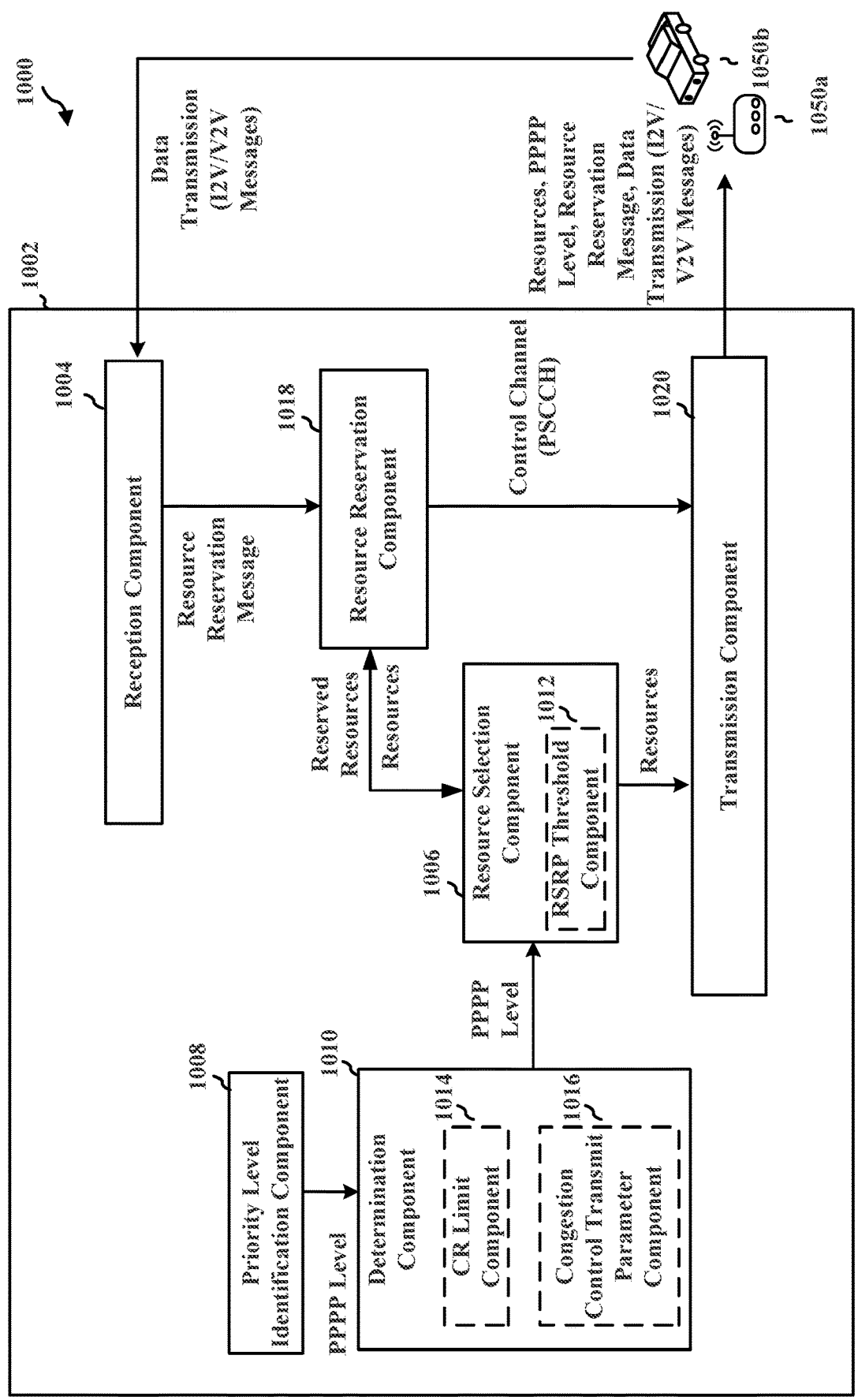
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a wireless device (e.g., the RSU 507, 802, the UE 104, 350, 402, 404, 502, 504, 804, or a component of the RSU or UE) that is in communication with a RSU 1050a (e.g. for V2I or other UE-originated communication) or with a UE 1050b (e.g. for I2V communication). The apparatus 1002 includes a reception component 1004 that receives wireless communication, e.g., based on V2X, V2V, D2D, etc. The reception component 1004 may be configured to receive communications in a shared resource pool.

The apparatus 1002 includes a resource selection component 1006 which is configured to select resources from a shared pool of resources in frequency and time, e.g., as described in connection with 809 and/or 902. The shared pool of resources are shared for I2V communication and UE originated communication over a PC5 interface (e.g. V2V, V2I, etc. communication). The apparatus 1002 also includes a priority level identification component 1008 which is configured to identify a priority level (e.g. a PPPP level) for communication from a set of priority levels for I2V communication and V2V communication, e.g., as described in connection with 904. The probability of selecting a resource for the communication of the identified priority level may be based at least in part on the priority level identified for the communication and the priority level that reserved at least part of the resource if any part of the resource is reserved. The set of priority levels may comprise at least one priority level unique to the I2V communication. The apparatus 1002 further includes a determination component 1010 which is configured to determine whether to transmit the I2V or V2V communication, e.g., as described in connection with 906. The resource selection component may include a RSRP threshold component 1012 configured to determine whether to transmit the I2V or V2V communication based on a RSRP threshold associated with the priority level identified for the communication. The RSRP threshold component 1012 may be configured to associate a smaller RSRP threshold with a first priority level that is unique to the I2V communication and to associate a larger RSRP threshold with a second priority level for communication originating from the UE.

The determination component 1010 may include a CR limit component 1014 configured to determine whether to transmit the communication based on a CR limit, e.g., as described in connection with 805, 906, or to drop the communication, e.g., as described in connection with 908.

The determination component 1010 further includes a congestion control transmit parameter component 1016 configured to determine how to transmit the I2V or V2V communication based on a set of congestion control parameters. For example, the wireless device may decide to transmit the message twice if CBR is less than 0.6 and only once if the CBR is greater than or equal to 0.6. In another aspect, the congestion control parameters may also depend on if I2V messages are detected at a wireless device. For example, if no I2V messages detected, a wireless device may decide to transmit a message twice or once depending on if the CBR is less than 0.5. Otherwise, the wireless device may decide to always transmit a message once.

The apparatus 1002 includes a resource reservation component 1018 configured to decode and parse received resource reservation messages and encode resource reservation messages, via a transmission component 1020. A resource reservation message may include a control channel (such as PSCCH) indicating a resource reservation period and PPPP level. The apparatus 1002 further includes the transmission component 1020, which is configured to transmit the I2V or V2V communication using the selected resources associated with the identified PPPP level, e.g., as described in connection with 910.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
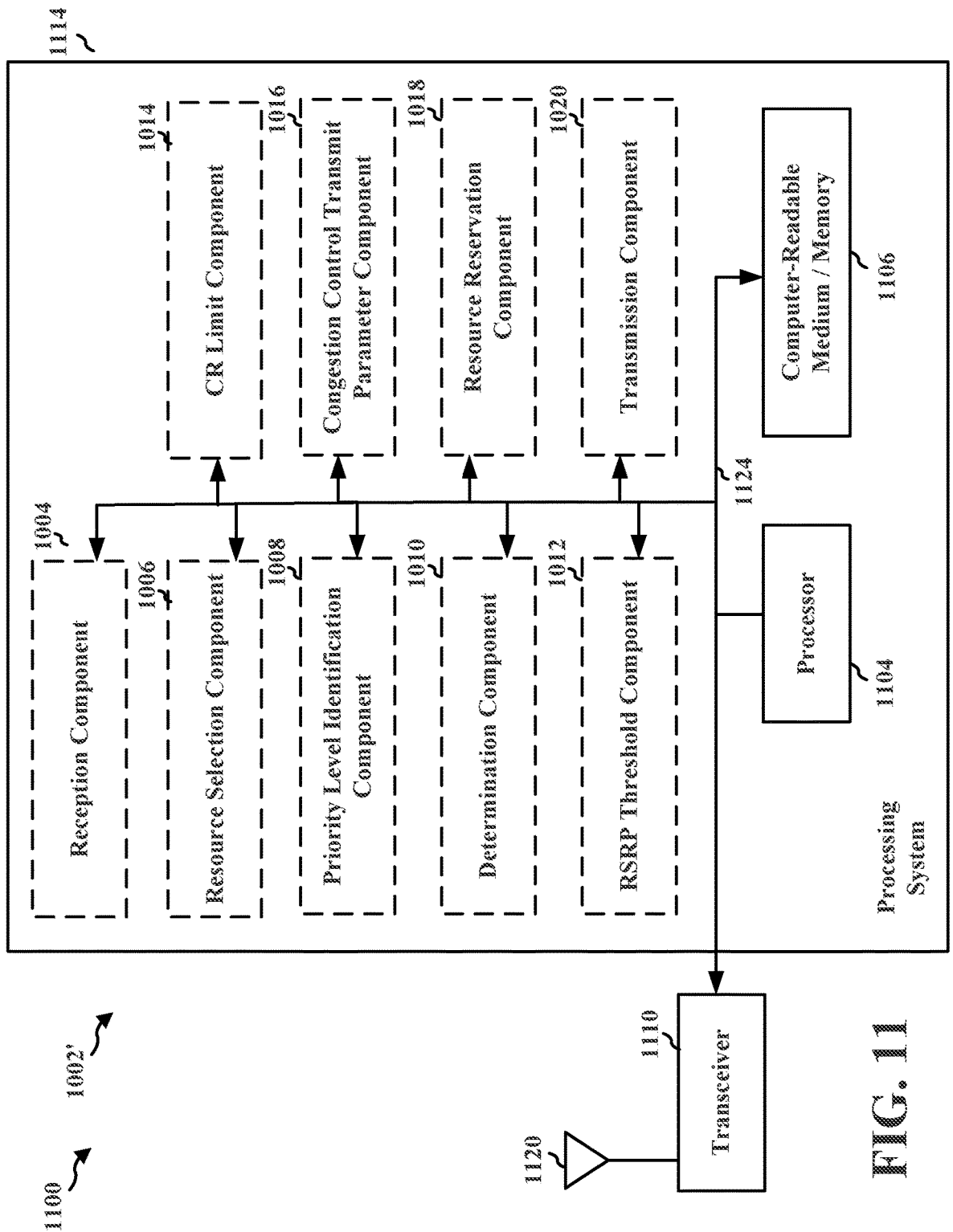
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1020, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020. The components may be software components running in the processor 1104, resident/stored in the computer readable medium/memory 1106, one or more hardware components coupled to the processor 1104, or some combination thereof. The processing system 1114 may be a component of the first transmitting device 310 or the second transmitting device 350 and may include the memory 376, 360 and/or at least one of the TX processor 316, 368, the RX processor 370, 356, and the controller/processor 375, 359. Alternatively, the processing system 1114 may be the entire device (e.g., see device 310 or 350 of FIG. 3).

In one configuration, the apparatus 1002/1002' for wireless communication includes means for selecting resources from a shared resource pool in frequency and time, where the shared resource pool is shared for I2V communication and communication over a PC5 interface originating from a UE. The apparatus 1002/1002' also includes means for identifying a first priority level for communication from a set of priority levels for I2V communication and UE originated communication.

In one configuration, the set of priority levels may comprise at least one priority level unique to the I2V communication.

In one configuration, the wireless device may comprise the UE, and the apparatus 1002/1002' may further include means for determining whether to transmit the communication based on a set of congestion control parameters, the UE may apply a first set of congestion control parameters if the UE detects the I2V communication, and the UE may apply a second set of congestion control parameters if the UE does not detect the I2V communication.

In one configuration, the set of congestion control parameters may comprise Channel Occupancy Ratio (CR) limits and at least one other transmit parameter that has a value depending on a Channel Busy Ratio (CBR).

In one configuration, the UE may calculate the CBR for a subset of resources other than I2V reserved resources associated with the at least one priority level unique to the I2V communication.

In one configuration, a probability of selecting a resource for the communication may be based at least in part on the first priority level identified for the communication and a second priority level that reserves at least a part of the resource if any part of the resource is reserved.

In one configuration, the apparatus 1002/1002' may further include means for determining whether to select a resource based on at least whether a Reference Signal Received Power (RSRP) threshold associated with a receive priority level that is associated with a reservation that includes at least a part of the resource and the identified first priority level of the communication is larger than a measured RSRP of a previous resource included in the reservation, and for each transmit priority level, a smaller RSRP threshold may be associated with a first receive priority level that may be unique to the I2V communication and a larger RSRP threshold may be associated with a second priority level for UE originated communication.

In one configuration, the smaller RSRP threshold associated with the first receive priority level that is unique to the I2V communication may be smaller than RSRP thresholds for each receive priority level of the set of priority levels that is allocated to at least one of the UE originated communication or the I2V communication.

In one configuration, the apparatus 1002/1002' may further include means for determining whether to transmit the communication based on a Channel Occupancy Ratio (CR) limit, a first priority level that is unique to the I2V communication may be associated with a higher CR limit, and a second priority level allocated to UE originated communication may be associated with a lower CR limit.

In one configuration, the first priority level that is unique to the I2V communication may be associated with a maximum CR limit.

In one configuration, the wireless device may comprise a Road Side Unit (RSU), and the RSU may select the priority level for the communication.

In one configuration, the wireless device may comprise a RSU, and the apparatus 1002/1002' may further include means for transmitting a resource reservation message comprising a control channel indicating a resource reservation period.

In one configuration, the UE may comprise a Vehicle UE (VUE).

In one configuration, the set of priority levels may comprise a set of ProSe Per Packet Priority (PPPP) levels.

In one configuration, the I2V communication may be transmitted by a Road Side Unit (RSU).

The aforementioned means may be one or more of the aforementioned components of the apparatus 1002 and/or the processing system 1114 of the apparatus 1002' configured to perform the functions recited by the aforementioned means. As described supra, the processing system 1114 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Accordingly, the present disclosure allows for dynamic resource sharing of I2V and V2V communication in a single resource pool. At least one PPPP level may be defined for an RSU to communicate with vehicles in an intersection, thus prioritizing and guaranteeing reservation of resources for I2V communications. Moreover, a maximal resource reservation for I2V communication may be provided (e.g. no more than 70-80% of the total resource) to prevent vehicles from being deprived of resources for V2V communication in I2V-traffic intensive situations. Furthermore, congestion control parameters may be different for vehicles which detect I2V traffic and for vehicles which do not detect I2V traffic, thereby providing more available resources for vehicles who detect the RSU to receive I2V communications.

The following examples are illustrative only and may be combined with aspects of other embodiments or teaching described herein, without limitation.

Example 1 is a method of wireless communication at a wireless device, comprising: selecting resources from a shared resource pool in frequency and time, wherein the shared resource pool is shared for Infrastructure-to-Vehicle (I2V) communication and communication over a PC5 interface originating from a User Equipment (UE); and identifying a first priority level for communication from a set of priority levels for I2V communication and UE originated communication.

In Example 2, the method of Example 1 further includes that the set of priority levels comprises at least one priority level unique to the I2V communication, and wherein a probability of selecting a resource for the communication is based at least in part on the first priority level identified for the communication and a second priority level that reserves at least a part of the resource if any part of the resource is reserved.

In Example 3, the method of Example 1 or 2 further includes that the UE comprises a VUE.

In Example 4, the method of any of Example 1-3 further includes that the set of priority levels comprises a set of PPPP levels.

In Example 5, the method of any of Example 1-4 further includes that the I2V communication is transmitted by a RSU.

In Example 6, the method of any of Example 1-5 further includes that the wireless device further determines whether to select a resource based on at least whether a Reference Signal Received Power (RSRP) threshold associated with a receive priority level that is associated with a reservation that includes at least a part of the resource and the identified first priority level of the communication is larger than a measured RSRP of a previous resource included in the reservation, and wherein, for each transmit priority level, a smaller RSRP threshold is associated with a first receive priority level that is unique to the I2V communication and a larger RSRP threshold is associated with a second priority level for UE originated communication.

In Example 7, the method of any of Example 1-6 further includes that the smaller RSRP threshold associated with the first receive priority level that is unique to the I2V communication is smaller than RSRP thresholds for each receive priority level of the set of priority levels that is allocated to at least one of the UE originated communication or the I2V communication.

In Example 8, the method of any of Example 1-7 further includes that the wireless device further determines whether to transmit the communication based on a CR limit, and wherein a first priority level that is unique to the I2V communication is associated with a higher CR limit, and a second priority level allocated to UE originated communication is associated with a lower CR limit.

In Example 9, the method of any of Example 1-8 further includes that the first priority level that is unique to the I2V communication is associated with a maximum CR limit.

In Example 10, the method of any of Example 1-9 further includes that the wireless device comprises a Road Side Unit (RSU), and that the RSU selects the priority level for the communication.

In Example 11, the method of any of Example 1-10 further includes that the wireless device comprises a RSU and includes transmitting a resource reservation message comprising a control channel indicating a resource reservation period.

In Example 12, the method of any of Example 1-11 further includes that the wireless device comprises the UE, and that the wireless device further determines whether to transmit the communication based on a set of congestion control parameters, where the UE applies a first set of congestion control parameters if the UE detects the I2V communication, and where the UE applies a second set of congestion control parameters if the UE does not detect the I2V communication.

In Example 13, the method of any of Example 1-12 further includes that the set of congestion control parameters comprises CR limits and at least one other transmit parameter that has a value depending on a CBR.

In Example 14, the method of any of Example 1-13 further includes that the UE calculates the CBR for a subset of resources other than I2V reserved resources associated with the at least one priority level unique to the I2V communication.

Example 15 is a device including one or more processors and one or more memories in electronic communication with the one or more processors storing instructions executable by the one or more processors to cause the system or apparatus to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:
   selecting resources from a shared resource pool in frequency and time, wherein the shared resource pool is shared for Infrastructure-to-Vehicle (I2V) communication and for communication over a PC5 interface originating from a User Equipment (UE);
   identifying a first priority level for a communication from a set of priority levels for I2V communication and UE originated communication, wherein the set of priority levels comprises at least one priority level unique to the I2V communication, and wherein at least one resource in the shared resource pool is available for I2V communication or for UE originated communication based at least in part on the set of priority levels;
   determining whether to transmit the communication based on a set of congestion control parameters, wherein, when wireless communication device comprises a first UE, the congestion control parameters comprises at least one transmit parameter that has a value depending on a channel busy ratio (CBR), wherein the CBR is calculated for a subset of resources other than I2V reserved resources associated with the at least one priority level unique to the I2V communication; and
   transmitting the communication based on the first priority level and the set of congestion control parameters.

2. The method of claim 1, wherein the first priority level comprises a priority level for UE originated communication, and wherein the UE applies a first set of congestion control parameters if the UE detects the I2V communication, and wherein the UE applies a second set of congestion control parameters if the UE does not detect the I2V communication.

3. The method of claim 2, wherein the set of congestion control parameters further comprises Channel Occupancy Ratio (CR) limits.

4. The method of claim 1, wherein a probability of selecting a resource for the communication is based at least in part on the first priority level identified for the communication and a second priority level that reserves at least a part of the resource if any part of the resource is reserved.

5. The method of claim 1, further comprising:
   determining whether to select a resource based on at least whether a Reference Signal Received Power (RSRP) threshold associated with a receive priority level that is associated with a reservation that includes at least a part of the resource and the identified first priority level of the communication is larger than a measured RSRP of a previous resource included in the reservation, and
   wherein, for each transmit priority level, a smaller RSRP threshold is associated with the at least one priority level that is unique to the I2V communication and a larger RSRP threshold is associated with a second priority level for UE originated communication.

6. The method of claim 5, wherein the smaller RSRP threshold associated with the at least one priority level that is unique to the I2V communication is smaller than RSRP thresholds for each receive priority level of the set of priority levels that is allocated to at least one of the UE originated communication or the I2V communication.

7. The method of claim 1, further comprising:
   determining whether to transmit the communication based on a Channel Occupancy Ratio (CR) limit, wherein the at least one priority level that is unique to the I2V communication is associated with a higher CR limit, and a second priority level allocated to UE originated communication is associated with a lower CR limit.

8. The method of claim 7, wherein the at least one priority level that is unique to the I2V communication is associated with a maximum CR limit.

9. The method of claim 7, wherein, when the wireless device comprises a Road Side Unit (RSU), the RSU selects the priority level for the communication.

10. The method of claim 1, wherein, when the wireless device comprises a Road Side Unit (RSU), the method further comprises:
    transmitting a resource reservation message comprising a control channel indicating a resource reservation period.

11. The method of claim 1, wherein the UE comprises a Vehicle UE (VUE).

12. The method of claim 1, wherein the set of priority levels comprises a set of ProSe Per Packet Priority (PPPP) levels.

13. The method of claim 1, wherein, when the wireless device comprises a Road Side Unit (RSU), the I2V communication is transmitted by the RSU.

14. An apparatus for wireless communication, comprising:
- means for selecting resources from a shared resource pool in frequency and time, wherein the shared resource pool is shared for Infrastructure-to-Vehicle (I2V) communication and for communication over a PC5 interface originating from a User Equipment (UE);
- means for identifying a first priority level for a communication from a set of priority levels for I2V communication and UE originated communication, wherein the set of priority levels comprises at least one priority level unique to the I2V communication, and wherein at least one resource in the shared resource pool is available for I2V communication or for UE originated communication based at least in part on the set of priority levels;
- means for determining whether to transmit the communication based on a set of congestion control parameters, wherein, when wireless communication device comprises a first UE, the congestion control parameters comprises at least one transmit parameter that has a value depending on a channel busy ratio (CBR), wherein the CBR is calculated for a subset of resources other than I2V reserved resources associated with the at least one priority level unique to the I2V communication; and
- means for transmitting the communication based on the first priority level and the set of congestion control parameters.

15. An apparatus for wireless communication, comprising:
- a memory comprising one or more memories; and
- at least one processor coupled to the memory and, wherein the at least one processor alone or in combination with another processor of the at least one processor is configured to:
  - select resources from a shared resource pool in frequency and time, wherein the shared resource pool is shared for Infrastructure-to-Vehicle (I2V) communication and for communication over a PC5 interface originating from a User Equipment (UE);
  - identify a first priority level for a communication from a set of priority levels for I2V communication and UE originated communication, wherein the set of priority levels comprises at least one priority level unique to the I2V communication, and wherein at least one resource in the shared resource pool is available for I2V communication or for UE originated communication based at least in part on the set of priority levels;
  - determine whether to transmit the communication based on a set of congestion control parameters, wherein, when wireless communication device comprises a first UE, the congestion control parameters comprises at least one transmit parameter that has a value depending on a channel busy ratio (CBR), wherein the CBR is calculated for a subset of resources other than I2V reserved resources associated with the at least one priority level unique to the I2V communication; and
  - transmit the communication based on the first priority level and the set of congestion control parameters.

16. The apparatus of claim 15, wherein the first priority level comprises a priority level for UE originated communication, and wherein the UE applies a first set of congestion control parameters if the UE detects the I2V communication, and wherein the UE applies a second set of congestion control parameters if the UE does not detect the I2V communication.

17. The apparatus of claim 16, wherein the set of congestion control parameters further comprises Channel Occupancy Ratio (CR) limits.

18. The apparatus of claim 15, wherein a probability of selecting a resource for the communication is based at least in part on the first priority level identified for the communication and a second priority level that reserves at least a part of the resource if any part of the resource is reserved.

19. The apparatus of claim 15, wherein the at least one processor is further configured to:
- determine whether to select a resource based on at least whether a Reference Signal Received Power (RSRP) threshold associated with a receive priority level that is associated with a reservation that includes at least a part of the resource and the identified first priority level of the communication is larger than a measured RSRP of a previous resource included in the reservation, and
- wherein, for each transmit priority level, a smaller RSRP threshold is associated with the at least one priority level that is unique to the I2V communication and a larger RSRP threshold is associated with a second priority level for UE originated communication.

20. The apparatus of claim 19, wherein the smaller RSRP threshold associated with the at least one priority level that is unique to the I2V communication is smaller than RSRP thresholds for each receive priority level of the set of priority levels that is allocated to at least one of the UE originated communication or the I2V communication.

21. The apparatus of claim 15, wherein the at least one processor is further configured to:
- determine whether to transmit the communication based on a Channel Occupancy Ratio (CR) limit, wherein the at least one priority level that is unique to the I2V communication is associated with a higher CR limit, and a second priority level allocated to UE originated communication is associated with a lower CR limit.

22. The apparatus of claim 21, wherein the at least one priority level that is unique to the I2V communication is associated with a maximum CR limit.

23. The apparatus of claim 21, wherein, when the wireless device comprises a Road Side Unit (RSU), the RSU selects the priority level for the communication.

24. The apparatus of claim 15, wherein, when the wireless device comprises a Road Side Unit (RSU), and wherein the at least one processor is further configured to:
- transmit a resource reservation message comprising a control channel indicating a resource reservation period.

25. The apparatus of claim 15, wherein the set of priority levels comprises a set of ProSe Per Packet Priority (PPPP) levels.

26. A non-transitory computer-readable medium storing computer executable code for wireless communication, the code when executed by a processor cause the processor to:
- select resources from a shared resource pool in frequency and time, wherein the shared resource pool is shared for Infrastructure-to-Vehicle (I2V) communication and for communication over a PC5 interface originating from a User Equipment (UE);
- identify a first priority level for a communication from a set of priority levels for I2V communication and UE originated communication, wherein the set of priority levels comprises at least one priority level unique to the I2V communication, and wherein at least one resource in the shared resource pool is available for I2V communication or for UE originated communication based at least in part on the set of priority levels;
determine whether to transmit the communication based on a set of congestion control parameters, wherein, when wireless communication device comprises a first UE, the congestion control parameters comprises at least one transmit parameter that has a value depending on a channel busy ratio (CBR), wherein the CBR is calculated for a subset of resources other than I2V reserved resources associated with the at least one priority level unique to the I2V communication; and
transmit the communication based on the first priority level and the set of congestion control parameters.

* * * * *